Figure 1:
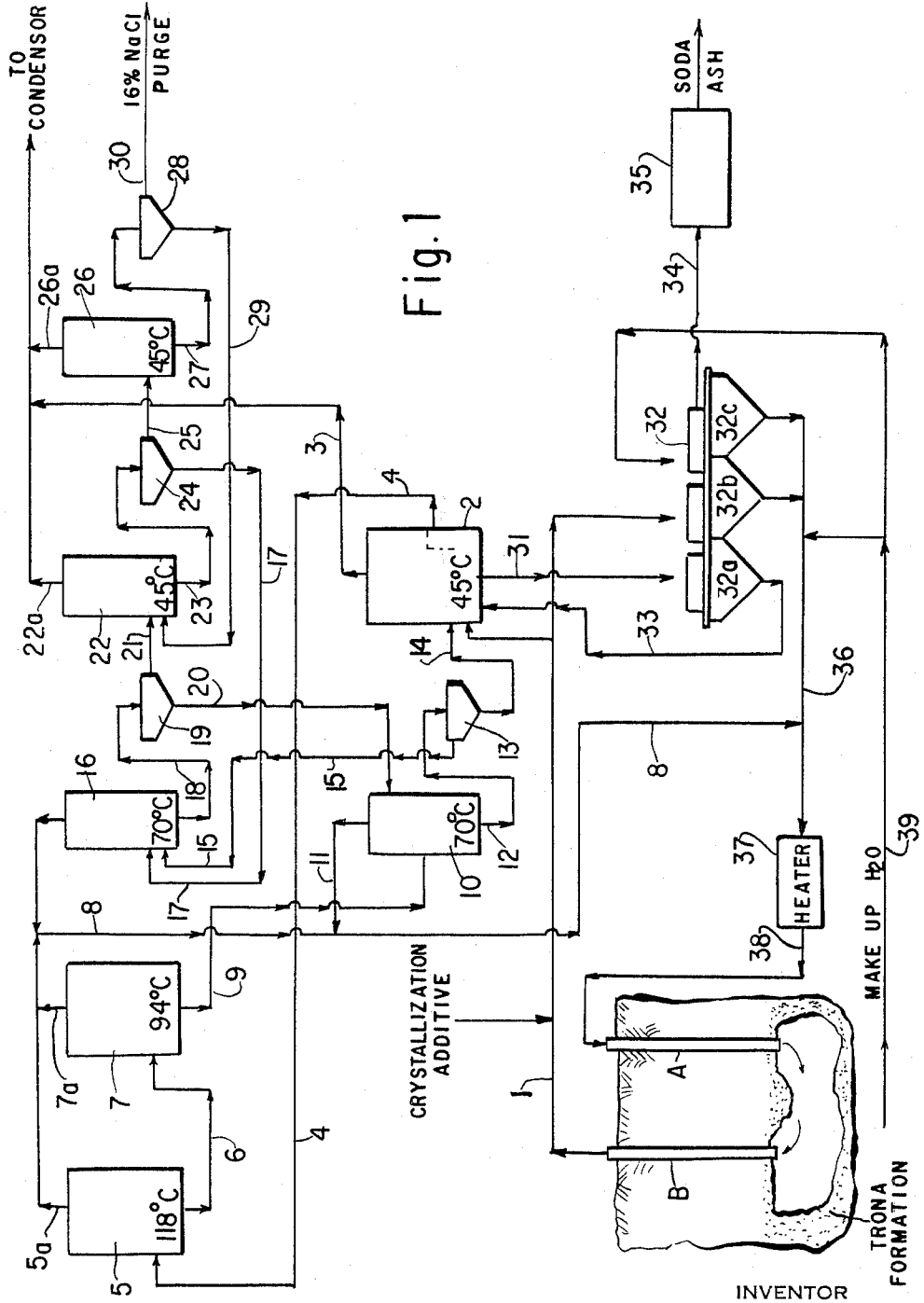

3,273,959
PROCESS OF RECOVERING SODIUM CARBONATE FROM THE MOTHER LIQUOR BLEED

Warren Standish Miller, Fullerton, Calif., assignor, by mesne assignments, to Intermountain Research & Development Corporation, Cheyenne, Wyo., a corporation of Wyoming
Filed June 16, 1965, Ser. No. 469,040
5 Claims. (Cl. 23—63)

This application is a continuation-in-part of application Serial No. 200,876, filed June 7, 1962 now abandoned.

This invention relates to an economical process for the production of soda ash from trona as found in Wyoming and similar deposits around the world, and particularly to the economical removal of sodium chloride from solution mined trona liquors or from plant liquors having a high sodium chloride content.

The trona deposits in southwestern Wyoming are found at a depth of 1200 to 1800 feet underground and consist of a main trona bed varying in thickness from 8 to 18 feet and other thinner beds of varying thickness. The trona consists mainly of sodium sesquicarbonate ($NaHCO_3 \cdot Na_2CO_3 2H_2O$) and 3 to 6% isoluble impurities. A typical analysis of the cude trona is:

| | Percent |
|---|---|
| $Na_2CO_3$ | 45 |
| $NaHCO_3$ | 36 |
| $H_2O$ | 15.3 |
| $NaCl$ | 0.04 |
| $Na_2SO_4$ | 0.01 |
| $Fe_2O_3$ | 0.08 |
| Insolubles | 3.6 |

The analysis varies in different parts of the bed and the sodium chloride content of the trona may run as high as 4% in some parts of the trona beds. The presence of sodium chloride in the sodium sesquicarbonate solutions which are processed to obtain soda ash is undesirable as the solubility of sodium sequicarbonate decreases as the sodium chloride content increases. This makes the recovery of sodium sesquicarbonate less economical because more solution is necessary to dissolve the trona and more solution has to be evaporated to recover the sodium sesquicarbonate crystals.

The sodium chloride content is not only increased due to the sodium chloride which is dissolved with the trona, but in a cyclic recovery process the sodium chloride content is further increased as the sodium chloride builds up in the recycling mother liquor used to dissolve and recover the trona. If a simple purge of some of the mother liquor is used in as U.S. Patent No. 2,798,790 to maintain a low level of sodium chloride in the system, large amounts of sodium carbonate values are lost.

If the sodium chloride is not removed from the mother liquor, in a cycling system, in which the mother liquor is returned to the mine to dissolve more trona, its accumulation in the mother liquor reduces the solubility of the trona in the mother liquor and tends to make solution mining processes uneconomical.

It is an object of this invention to provide a novel economical solution mining process for the recovery of soda ash from crude trona in which sodium chloride in the solution liquors is economically removed.

It is a further object of the invention to provide a process for purging sodium chloride from sodium carbonate-sodium bicarbonate solutions, produced either by a solution mining or by dissolving dry mined trona, in which the amount of carbonate values lost with the sodium chloride purge is not materially higher than the amount of sodium chloride purged from the process.

It is another object of the invention to purge sodium chloride from a solution mining process for the recovery of soda ash from crude trona without discarding large amounts of sodium carbonate values and without increasing the amount of water to be evaporated.

It is an additional object of the invention to provide a process for recovering carbonate values from a purge stream from a sodium sesquicarbonate process in the form of sodium sesquicarbonate.

These and other objects and advantages of the invention will become obvious from the following detailed description.

The process of the invention comprises dissolving the crude trona in a recycling mother liquor to form an aqueous solution of sodium sesquicarbonate, evaporating water from the sodium sesquicarbonate solution to form a major slurry of sodium sesquicarbonate crystals in a mother liquor, bleeding off a portion of the mother liquor from the major slurry, evaporating water from the bleed stream until the sodium chloride content is near its saturation point to form a minor slurry of sodium sesquicarbonate and sodium carbonate monhydrate crystals in mother liquor, separating the mother liquor of high sodium chloride content from the minor slurry, discarding the minor mother liquor, recycling the minor crystal crop to the major evaporation step wherein the sodium carbonate monohydrate crystals dissolved in the slurry of sodium sesquicarbonate crystals, separating the mother liquor from the major slurry of sodium sesquicarbonate crystals, recycling the major mother liquor to dissolve more trona, calcining the major sodium sesquicarbonate crystals to soda ash and recovering the soda ash.

The process is applicable to trona solution mining processes, the trona dry mining processes in which dry mined trona is dissolved in a recycling mother liquor and to other processes in which it is desirable to concentrate and remove sodium chloride from a recycling sodium carbonate stream without loss of a large amount of the sodium carbonate values and without increasing the total amount of water to be evaporated to produce a given yield of sodium sesquicarbonate crystals. It will be described herein primarily with reference to trona solution mining processes.

By using the process of this invention, the sodium chloride in the dissolving solutions of a recycling system is kept low, without the loss of large amounts of sodium carbonate values in the purge stream.

Figure 2:
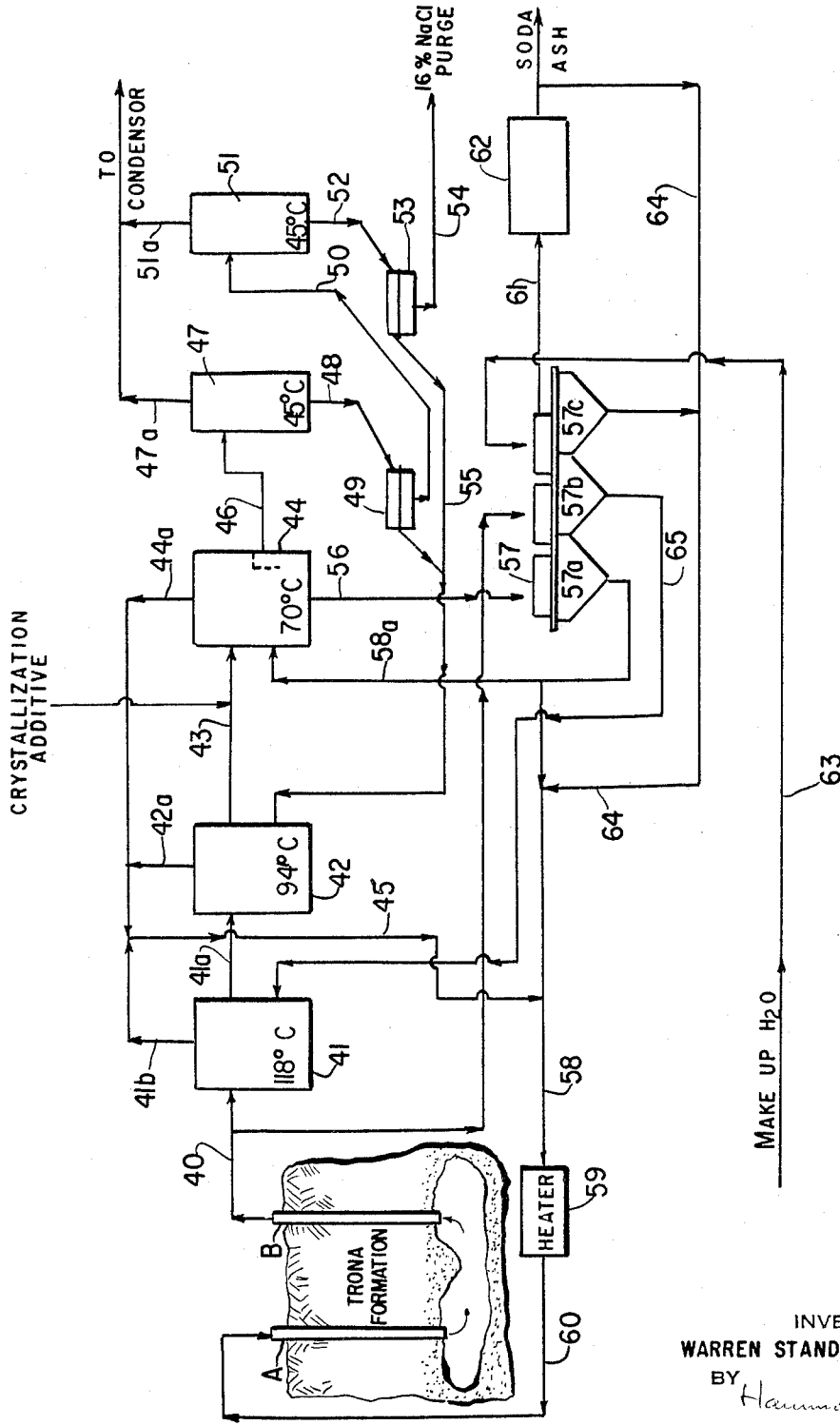

In the accompanying drawings, FIG. 1 and FIG. 2 are diagrammatical flow sheets illustrating two different embodiments of the production of soda ash from solution mined trona. It will be readily apparent how the process could be modified for the removal of sodium chloride from recycling mother liquors used in a dry mined trona process or from recycling mother liquors used in any process in which sodium carbonate is to be recovered from a solution thereof in which sodium chloride tends to accumulate.

In the embodiment of FIGURE 1, the trona solution is removed from the underground trona formation after circulation through the formation between wells A and B at a saturation temperature of 55° C. and flowed through line 1 to a vacuum crystallizer 2 which is maintained at 45° C. The solution mined liquor at this point contains about 1.5% NaCl. There is also introduced into crystallizer 2 a mixture of sodium sesquicarbonate and sodium carbonate monohydrate crystals from settler 13 via line 14. The water vapor from crystallizer 2 is removed via line 3 to a barometric condenser and a stream of mother liquor is removed through line 4 to vacuum crystallizer 5 maintained at 118° C. and the partially concentrated liquor from crystallizer 5 flows through line 6 to vacuum crystallizer 7 maintained at 94° C. The water vapor is removed from crystallizers 5 and 7 via lines 5a and 7a and after condensation is added to the dissolving mother liquor by line 8.

The mother liquor from crystallizer 7 is introduced by line 9 to vacuum crystallizer 10 maintained at 70° C. The water vapor is removed, condensed and added to line 8 via line 11. A slurry of sodium sesquicarbonate and sodium carbonate monohydrate crystals is removed from crystallizer 10 through line 12 to a settler 13 where the crystal slurry is separated from the mother liquor. The slurry underflowing from settler 13 is removed through line 14 to crystallizer 2 as previously described and the clarified mother liquor is removed from the settler 13 through line 15 and introduced into another vacuum crystallizer 16 maintained at 70° C. At this point the liquor contains about 3.6% NaCl. The underflow from settler 24 hereinafter described is also added into crystallizer 16 through line 17. The condensate from the crystallizer 16 is added to line 8 for recirculation to the underground trona formation through wells A and B. The crystal slurry from the crystallizer 16 flows through line 18 to settler 19 and the slurry underflowing from the settler 19 is pumped through line 20 to crystallizer 10.

The clear mother liquor overflowing from the settler 19 and containing about 6% NaCl flows through line 21 to crystallizer 22 maintained at 45° C. wherein it is mixed with the underflow from settler 28. The crystal slurry from crystallizer 22 is fed through line 23 to settler 24 and the underflow from settler 24 is removed through line 17 to crystallizer 16. The mother liquor now containing about 10% NaCl overflows from the settler 24 and is removed through line 25 to vacuum crystallizer 26 maintained at 45° C. The water vapor from crystallizers 22 and 26 is led off through lines 22a and 26a to a barometric condenser. The crystal slurry from crystallizer 26 is removed through line 27 to settler 28. The underflow from settler 28 is led by line 29 to crystallizer 22 and the mother liquor overflow from settler 28 now containing about 16% NaCl is discarded from the system through line 30.

In crystallizer 2 the trona solution from the wells B is mixed with the crystal slurry of sodium sesquicarbonate crystals and sodium carbonate monohydrate crystals from the settler 13. The monohydrate crystals in this slurry dissolve and increase the sodium carbonate concentration in crystallizer 2 and the sodium chloride in the slurry from the settler 13 when mixed with the trona solution coming from the well system increases the overall sodium chloride content. Both of these effects reduce the solubility of the sodium sesquicarbonate and cause some of it to crystallize from the solution in crystallizer 2. Additional crystallization is effected by the cooling and evaporation of water from the solution in the crystallizer. The crystal slurry of sodium sesquicarbonate is led by line 31 to a traveling pan filter 32 which passes over vacuum chambers 32a, 32b and 32c wherein the crystals are separated from the mother liquor. The mother liquor from vacuum chamber 32a is removed through line 33 and added to crystallizer 2.

The sodium sesquicarbonate crystals on the filter may be washed successively with trona solution from the wells A and B over vacuum chamber 32b and make-up water introduced into the system from line 39 over vacuum chamber 32c and the washed and suction dried crystals are removed by line 34 to calciner 35 wherein the sodium sesquicarbonate crystals are calcined to soda ash. The wash water from the filter is mixed with makeup water introduced through line 39 and the condensate from line 8 and the mixture is passed through line 36 and heater 37 into the well A through line 38 and thence through the cavity in the trona formation, to well B to dissolve more trona.

The trona solution feed stream from well B saturated at 55° C. will contain by weight about 15.86% $NaCO_3$, 6.42% $NaHCO_3$, 1.5% NaCl and 76.22% $H_2O$ and when the conditions of operation of the embodiment of FIG. 1 are set to provide for a total evaporation of 40% of the water content of the weed stream, in the various crystallizers, the combined feed streams 1, 14 and 33 fed into crystallizer 2 will result in the precipitation of 108.4 lbs. of sodium sesquicarbonate for each 1000 lb. of feed liquor from the wells and will leave a mother liquor from the filter 32 with the composition 19.1% $Na_2CO_3$, 3.25% $NaHCO_3$, 2.17% NaCl and 75.5% $H_2O$, which is diluted with makeup water and recirculated through the well circuit.

The amount of the purge stream 30 may be adjusted from time to time so that the sodium chloride content of the well feed stream 38 will be 1.30%. The concentration of the purge stream 30 is maintained at 16% sodium chloride by adjusting the flow into the purge stream evaporation through line 15 to crystallizer 16 as follows:

The flow of mother liquor from crystallizer 2 through line 4 to crystallizer 5 is regulated so that the liquor overflowing from settler 13 and going through line 15 to crystallizer 16 will contain about 3.6% NaCl. In crystallizer 16, the NaCl concentration is increased to 6%, the precipitate is removed in settler 19 and the overflow liquor goes to crystallizer 22 in which the NaCl content is increased to 10%. The precipitated sodium carbonate values (mixture of sodium sesquicarbonate and sodium carbonate monohydrate crystals) are removed in settler 24 and the clear mother liquor containing 10% NaCl, but greatly reduced in volume, goes to crystallizer 26 where more solution is evaporated and the NaCl concentration increased to 16%. The sodium carbonate values precipitated in crystallizer 26 are removed in settler 28 and returned to crystallizer 22 and the clear overflow liquor now containing about 16% NaCl is discarded through purge line 30. At this point, the clear overflow purge liquor from settler 28 contains 15% $Na_2CO_3$, 1% $NaHCO_3$, 16% NaCl and 68% $H_2O$, so that only about one pound sodium carbonate value is lost for each pound of sodium chloride discarded. By the process illustrated and described the sodium chloride in the well liquors can be economically concentrated and discarded without discard of an excessive amount of sodium carbonate values and most of the sodium carbonate values in the well liquors are economically recovered.

*Example I*

In the following Table I, there is shown the conditions maintained in the system described in FIG. 1 to process 1000 pounds of trona solution from the wells, saturated at 55° C., and containing 1.5% NaCl, based upon the total evaporation of 40% of the water content of the trona solution feed stream from well B to crystallizer 2 with loss of 1.38 lbs. $CO_2$ and the production of 73.3 lbs. soda ash.

TABLE I.—COMPOSITION PER 1,000 LBS. SOLUTION FROM WELLS

| Position in System | Weight Percentage | | | | Pounds | | | | |
|---|---|---|---|---|---|---|---|---|---|
| | $Na_2CO_3$ | $NaHCO_3$ | NaCl | $H_2O$ | $Na_2CO_3$ | $NaHCO_3$ | NaCl | $H_2O$ | Total |
| 1—Trona Solution from Wells saturated at 55° C | 15.86 | 6.42 | 1.5 | 76.22 | 158.6 | 64.2 | 15.0 | 762.2 | 1,000 |
| 2—Evaporated 40% of $H_2O$ | | | | | | | | 304.9 | |
| 3—NaCl purge out (line 30) | 15.0 | 1.0 | 16.0 | 68.0 | 2.49 | 0.17 | 2.66 | 11.28 | 16.6 |
| 4—Loss 1.38 lbs. $CO_2$ | | | | | +3.33 | −5.27 | | +.6 | |
| 5—Remainder | 23.53 | 8.67 | 1.82 | 65.98 | 159.4 | 58.76 | 12.34 | 446.6 | 677.1 |
| 6—Solubility with salt, 45° C. (Crystallizer 2) | 19.0 | 3.25 | 2.18 | 75.6 | | | | | |
| 7—Sesquicarbonate, ppt | | | | | 50.80 | 40.25 | | 17.3 | 108.4 |
| 8—Mother liquor remainder (line 36) | 19.1 | 3.25 | 2.17 | 75.5 | 108.6 | 18.51 | 12.34 | 429.3 | 568.7 |
| 9—Dissolve 4% of sesquicarbonate (by wash on filters 32b and 32c; rest out 34 to calciner 35) | | | | | 48.77 | 38.64 | .07 | 16.6 | 104.1 |
| 10—Residual liquor for well stream | | | | | 110.7 | 20.12 | 12.27 | 430.0 | 573.0 |
| 11—Dissolved in well | | | | | 62.0 | 49.10 | 3.96 | 21.0 | 136.1 |
| 12—Remain in new cavity | 15.86 | 6.42 | 1.5 | 76.2 | 12.35 | 5.00 | 1.17 | 59.3 | 77.9 |
| 13—Net from well | | | | | 49.65 | 44.10 | 2.79 | −38.3 | 58.2 |
| 14—Makeup $H_2O$ required (line 39) (Before return of Condensate from line 8 approximately 214 lbs. Condensate) | | | | | | | | 370.5 | 370.5 |
| Liquor from well | | | | | 160.3 | 64.22 | 15.06 | 762.2 | 1,002 |
| Difference around cycle | | | | | 1.7 | .02 | .06 | | 1.8 |
| 15—well feed (line 38) | 11.73 | 2.13 | 1.30 | 84.8 | 110.7 | 20.12 | 12.27 | 800.5 | 943.5 |
| 18—Crystallizer 26 feed | 20.8 | 1.1 | 10.0 | 68.1 | | | | | 55.5 |
| 17—Crystallizer 26 evaporation | | | | | | | | 13.06 | |
| 20—Crystallizer 22 evaporation | | | | | | | | 29.0 | |
| 21—Crystallizer 22 feed | 24.8 | 1.3 | 6.0 | 67.9 | | | | | 144.6 |
| 23—Crystallizer 16 evaporation | | | | | | | | 44.65 | |
| 24—Crystallizer 16 feed | 27.0 | 1.6 | 3.6 | 67.8 | | | | | 279 |
| 26—Crystallizer 5, 7 and 10 evaporation | | | | | | | | 169 | |
| 27—Crystallizer 5 feed | 19.1 | 3.25 | 2.17 | 75.5 | | | | | 655 |

Soda ash produced, 73.3 lbs.  Evaporation, 4.18 lbs. $H_2O$ per lb. soda ash.

UNDERFLOW 30% SOLID PHASE

| | Total, lbs. | Liquid, lbs. | Solid, lbs. |
|---|---|---|---|
| 16—Settler 28 | 25.80 | 18.07 | 7.74 |
| 19—Settler 24 | 85.7 | 60.0 | 25.7 |
| 22—Settler 19 | 175.9 | 123.0 | 52.8 |

UNDERFLOW 16.1% SOLID PHASE

| | | | |
|---|---|---|---|
| 25—Settler 13 | 383 | 321 | 61.7 |

The diagrammatical illustration of FIG. 1 has been simplified and many parts omitted for greater clarity. In actual operation the vapors from crystallizer 5 are used to supply heat to crystallizers 10 and 16 and the vapors from 10 and 16 are condensed as heat supply to crystallizers 22, 26 and 2.

In the embodiment illustrated in FIG. 2, the trona solution is removed from the well B at a saturation temperature of 55° C., via line 40 to vacuum crystallizer 41 maintained at 118° C. The resulting solution is removed from crystallizer 41 through line 41a to vacuum crystallizer 42 maintained at 94° C. where it is mixed with the filter cake from filters 49 and 53. The filter cake from filters 49 and 53 will contain a mixture of sodium sesquicarbonate and sodium carbonate monohydrate crystals. The monohydrate crystals will dissolve in crystallizer 42 and only sodium sesquicarbonate crystals will be precipitated in crystallizer 44. The solution is removed from crystallizer 42 via line 43 to vacuum crystallizer 44 maintained at 70° C. where it is mixed with the mother liquor from filter 57a. The water vapor from the crystallizers 41, 42 and 44 is removed by lines 41b, 42a and 44a and condensed and recycled by line 45 to the dissolving solution.

A portion of the solution is bled from crystallizer 44 by line 46 to vacuum crystallizer 47 maintained at 45° C. The slurry formed in crystallizer 47 is removed by line 48 to filter 49. The mother liquor from filter 49 is conducted by line 50 to vacuum crystallizer 51 maintained at 45° C. The slurry from crystallizer 51 is removed by line 52 to filter 53 and the mother liquor from filter 53 is purged from the system by line 54. The water vapor from crystallizers 47 and 51 is removed by lines 47a and 51a to a barometric condenser. The crystals from filters 49 and 53 are recycled by line 55 to crystallizer 42.

The slurry of sodium sesquicarbonate crystals and mother liquor formed in crystallizer 44 is removed by line 56 to a traveling pan filter 57 which passes over vacuum chambers 57a, 57b and 57c wherein the mother liquor is removed from the said crystals by vacuum chamber 57a and the crystals are washed successively with trona solution from the well B over vacuum chamber 57b and makeup water from line 63 over vacuum chamber 57c to reduce the NaCl content. The separated mother liquor is removed from vacuum chamber 57a by line 58 and part of the mother liquor is recycled through line 58a to crystallizer 44 and the remainder is added to the wash water from vacuum chamber 57c and heated in heater 59 and then recycled to the wells A and B via line 60. The wash water from vacuum chamber 57b is recycled through line 65 to crystallizer 41. The sodium sesquicarbonate crystals are removed from filter 57 by conveyor 61 to calciner 62 wherein the sodium sesquicarbonate crystals are calcined to soda ash. A part of the soda ash is returned through line 64 to line 58 to maintain the proper sodium carbonate to sodium bicarbonate ratio in the dissolving solution going into well A.

By the concentration of the sodium chloride effected by evaporating 60% of the water through the system illustrated in FIG. 2 and assuming a loss of 3 pounds of $CO_2$ for every 1000 lbs. of water evaporated from the solution coming from well B in the purge from line 54 will contain 3.0 lbs. $Na_2CO_3$, .20 lbs. $NaHCO_3$, 3.20 lbs. NaCl and 13.6 lbs. $H_2O$ and 90.60 lbs. of product soda ash containing 0.1% NaCl will be produced from calciner 62. This requires the net evaporation of 5.06 lbs. of water for each pound of product soda ash produced.

Example II

In Table II the conditions maintained in the system described in FIG. 2 to process 1000 pounds of trona solution from the wells are set forth with reference to the composition of the solutions and products at each of the major steps of this process assuming 1.38 pounds of carbon dioxide lost in the process which is equal to 3.0 pounds per 1000 pounds of water evaporated.

TABLE II.—COMPOSITION PER 1,000 LBS. SOLUTION FROM WELLS

| Position in System | Weight Percentage | | | | Pounds | | | | |
|---|---|---|---|---|---|---|---|---|---|
| | $Na_2CO_3$ | $NaHCO_3$ | NaCl | $H_2O$ | $NaCO_3$ | $NaHCO_3$ | NaCl | $H_2O$ | Total |
| Trona solution from wells saturated at 55° C | 15.86 | 6.42 | 1.5 | 76.22 | 158.6 | 64.2 | 15.0 | 762.2 | 1,000 |
| Evaporate 60% of $H_2O$ | | | | | | | | 458.0 | 458.0 |
| $CO_2$ loss | | | | | 3.32 | −5.27 | | +.56 | −1.38 |
| Discard NaCl purge (line 54) | 15.0 | 1.0 | 16.0 | 68.0 | 3.0 | 0.20 | 3.2 | 13.6 | 20 |
| Remainder | 30.5 | 11.28 | 2.27 | 55.95 | 158.9 | 58.7 | 11.8 | 291.2 | 520.6 |
| Sodium sesquicarbonate solubility 70% C. with 3.06% salt | 24.81 | 2.28 | 3.06 | | | | | | |
| Sesquicarbonate precipitate (crystallizer 44) | | | | | 63.0 | 49.9 | | 21.4 | 134.3 |
| Mother Liquor remainder (line 58) | 24.82 | 2.28 | 3.06 | 69.84 | 95.9 | 8.80 | 11.8 | 269.8 | 386.3 |
| Dissolve 4% of sesquicarbonate by wash on filter 57—rest out to calciner 62 | | | | | 60.5 | 47.9 | | 20.5 | 128.9 |
| Moisture to calciner 62 | | | | | | | 0.09 | 19.3 | 19.39 |
| Residual liquor for well stream 58 | 23.85 | 3.32 | 2.74 | 70.1 | 98.4 | 10.8 | 11.71 | 251.4 | 372.31 |
| Dissolved in well | | | | | 74.9 | 59.4 | 4.79 | 25.45 | 164.54 |
| Left in new cavity | 15.86 | 6.42 | 1.5 | 76.22 | 14.82 | 6.0 | 1.40 | 71.28 | 93.05 |
| Net from well B | | | | | 60.08 | 53.4 | 3.39 | −45.83 | 71.4 |
| Make up composition to balance system | | | | | 0.12 | | | *556.63 | 556.75 |
| Difference around cycle | | | | | | | 0.1 | | 0.1 |
| Well feed line 60 | 10.98 | 1.32 | 1.09 | 86.6 | 100.3 | 12.41 | 10.25 | 813.2 | 936.1 |

*Condensate supplies 339 lbs. of this make up water.
128.9 lbs. sodium sesquicarbonate to calciner 62 make 90.6 lbs. soda ash.
458.0 lbs. water evaporated per 90.60 lbs. soda ash=5.06 lbs. water evaporated per lbs. soda ash.

While the above are the preferred conditions of operation of the embodiment of FIG. 2, other conditions can be maintained.

If desired crystallization promotion additives may be added to crystallizers 44 and 2 (FIG. 1) to promote the production of large size sodium sesquicarbonate crystals. Additives from the group consisting of (1) alkyl benzene sulfonates containing at least 8 alkyl carbon atoms, (2) alkyl naphthalene sulfonates containing at least 4 alkyl carbon atoms, (3) primary alkyl alcohol sulfates containing at least 10 carbon atoms, and (4) N-substituted taurines of the formula $R'R''NCH_2CH_2SO_3M$, where R' is a hydrocarbon radical, R'' is the acyl radical of a higher fatty acid and M is an alkali metal, as described in U.S. Patent No. 2,954,282 have been found to provide particularly valuable crystal characteristics for sodium sesquicarbonate crystals and for the soda ash made therefrom.

The process of the invention is not only applicable to solution mined trona but also to dry mined trona which has been dissolved in the recycling mother liquor and clarified to remove insoluble materials and to other plant liquors containing sodium carbonate values contaminated with sodium chloride.

While the processes of my invention have been described in diagrammatic outline, it will be understood that other operating details are used and that various modifications of the process of the invention may be made without departing from the spirit of the invention or the scope of the appended claims.

I claim:

1. A process for the production of soda ash from crude trona which comprises dissolving the trona in a recycling mother liquor to form an aqueous solution of sodium sesquicarbonate containing sodium chloride, evaporating water from the sodium sesquicarbonate solution to form a major slurry of sodium sesquicarbonate crystals in a mother liquor, bleeding off a portion of the mother liquor from the slurry when the mother liquor contains approximately 6% sodium chloride, evaporating water from the bleed stream until the sodium chloride content is near its saturation point to form a minor slurry of sodium sesquicarbonate and sodium carbonate monohydrate crystals in a mother liquor, separating the mother liquor of high sodium chloride content from the minor slurry of crystals, discarding the minor mother liquor, recycling the sodium sesquicarbonate and sodium carbonate monohydrate crystals from the minor slurry to the major slurry of sodium sesquicarbonate in mother liquor from which the bleed stream has been removed, wherein the said monohydrate crystals dissolve in the major slurry of sodium sesquicarbonate crystals, separating the mother liquor and the sodium sesquicarbonate crystals in the major slurry which contains only sodium sesquicarbonate crystals, recycling the major mother liquor to dissolve more trona, calcining the sodium sesquicarbonate crystals separated from the major slurry to soda ash and recovering the said soda ash.

2. A process for the production of soda ash from crude trona which comprises dissolving the trona in a recycling mother liquor to form an aqueous solution of sodium sesquicarbonate containing sodium chloride, evaporating water from the sodium sesquicarbonate solution to form a major slurry of sodium sesquicarbonate crystals in a mother liquor, bleeding off a portion of the mother liquor from the slurry when the mother liquor contains approximately 6% sodium chloride, evaporating water from the bleed stream in a plurality of stages until the sodium chloride content is near its saturation point to form a minor slurry of sodium sesquicarbonate and sodium carbonate monohydrate crystals in a mother liquor, precipitating and removing sodium sesquicarbonate and sodium carbonate monohydrate crystals from the minor slurry in each stage and re-adding the precipitated sodium sesquicarbonate and sodium carbonate monohydrate crystals to the bleed stream slurry at an earlier stage, separating the mother liquor of high sodium chloride content from the final minor slurry of crystals, discarding the minor mother liquor of high sodium chloride content, recycling the sodium sesquicarbonate and sodium carbonate monohydrate crystals from the minor slurry to the major slurry of sodium sesquicarbonate crystals in mother liquor from which the bleed stream has been removed wherein the said monohydrate crystals dissolve in the major slurry of sodium sesquicarbonate crystals, separating the mother liquor and the sodium sesquicarbonate crystals in the major slurry which contains only sodium sesquicarbonate crystals, recycling the major mother liquor to dissolve more trona, calcining the sodium sesquicarbonate crystals separated from the major slurry to soda ash and recovering the said soda ash.

3. A process for the production of soda ash from crude trona which comprises dissolving the trona in a recycling mother liquor to form an aqueous solution of sodium sesquicarbonate containing sodium chloride, adding a crystallization promoter to said solution evaporating water from the sodium sesquicarbonate solution to form a major slurry of sodium sesquicarbonate crystals in a mother liquor, bleeding off a portion of the mother liquor from the slurry when the mother liquor contains approximately 6% sodium chloride, evaporating water from the bleed stream in a plurality of stages until the sodium chloride content is near its saturation point to form a minor slurry of sodium sesquicarbonate and sodium carbonate monohydrate crystals in a mother liquor, precipitating and removing sodium sesquicarbonate and sodium carbonate monohydrate crystals from the minor slurry in each stage and re-adding the precipitated sodium sesquicarbonate and sodium carbonate monohydrate crystals to the minor slurry at an earlier stage, separating the mother liquor of high sodium chloride content from the final minor slurry of crystals, discarding the minor mother liquor, recycling the sodium sesquicarbonate and sodium carbonate monohydrate crystals from the minor slurry to the major slurry of sodium sesquicarbonate crystals in mother liquor from which the bleed stream has been removed wherein the said monohydrate crystals dissolve in the major slurry of sodium sesquicarbonate crystals, separating the mother liquor and the sodium sesquicarbonate crystals in the major slurry which contains only sodium sesquicarbonate crystals, recycling the major mother liquor to dissolve more trona, calcining the sodium sesquicarbonate crystals separated from the major slurry to soda ash and recovering the said soda ash.

4. A process for the production of soda ash from crude trona which comprises dissolving the trona in a recycling mother liquor to form an aqueous solution of sodium sesquicarbonate containing sodium chloride, evaporating water from the sodium sesquicarbonate solution to form a major slurry of sodium sesquicarbonate crystals in a mother liquor, bleeding off during said crystallization a solution containing 6% sodium chloride, evaporating water from the bleed stream in a plurality of stages until the sodium chloride content is near its saturation point to form a minor slurry of sodium sesquicarbonate and sodium carbonate monohydrate crystals in a mother liquor, precipitating and removing sodium sesquicarbonate and sodium carbonate monohydrate crystals from the minor slurry in each stage and readding the precipitated sodium sesquicarbonate and sodium carbonate monohydrate crystals to the minor slurry at an earlier stage, separating the mother liquor having a sodium chloride content of 16% from the minor slurry of sodium sesquicarbonate and sodium carbonate monohydrate crystals, discarding the minor mother liquor, recycling the sodium sesquicarbonate and sodium carbonate monohydrate crystals from the minor slurry to the major slurry of sodium sesquicarbonate crystals in mother liquor from which the bleed stream has been removed wherein the said monohydrate crystals dissolve in the major slurry of sodium sesquicarbonate crystals, separating the mother liquor and the sodium sesquicarbonate crystals in the major slurry which contains only sodium sesquicarbonate crystals, adding make up water to the major mother liquor, recycling the major mother liquor to dissolve more trona, calcining the sodium sesquicarbonate crystals separated from the major slurry to soda ash and recovering the said soda ash.

5. A process for the production of soda ash from crude trona which comprises dissolving the trona in a recycling mother liquor to form an aqueous solution of sodium sesquicarbonate saturated at about 55° C. and containing sodium chloride, adding a crystallization promoter to said solution, evaporating water from the sodium sesquicarbonate solution to form a major slurry of sodium sesquicarbonate crystals in a mother liquor, bleeding off during said evaporation a solution containing 6% sodium chloride, evaporating water from the bleed stream in a plurality of stages until the sodium chloride content is near its saturation point to form a minor slurry of sodium sesquicarbonate and sodium carbonate monohydrate crystals in a mother liquor, precipitating and removing sodium sesquicarbonate and sodium carbonate monohydrate crystals from the minor slurry in each stage and readding the precipitated sodium sesquicarbonate crystals to the minor slurry at an earlier stage, separating the mother liquor having a sodium chloride content of 16% from the minor slurry of sodium sesquicarbonate and sodium carbonate monohydrate crystals, discarding the minor mother liquor, recycling the sodium sesquicarbonate and sodium carbonate monohydrate crystals from the minor slurry to the major slurry of sodium sesquicarbonate crystals in mother liquor from which the bleed stream has been removed wherein the said monohydrate crystals dissolve in the major slurry of sodium sesquicarbonate crystals, separating the mother liquor and the sodium sesquicarbonate crystals in the major slurry which contains only sodium sesquicarbonate crystals, adding make up water to the major mother liquor, recycling the major mother liquor to dissolve more trona, calcining the sodium sesquicarbonate crystals separated from the major slurry to soda ash and recovering the said soda ash.

References Cited by the Examiner
UNITED STATES PATENTS

| | | | |
|---|---|---|---|
| 2,704,239 | 3/1955 | Pike | 23—63 XR |
| 2,798,790 | 7/1957 | Pike | 23—63 |
| 3,084,026 | 4/1963 | Frint et al. | 23—63 X |
| 3,119,655 | 1/1964 | Frint et al. | 23—63 |
| 3,189,408 | 6/1965 | Miller | 23—63 |

OSCAR R. VERTIZ, *Primary Examiner.*

BENJAMIN HENKIN, *Examiner.*

G. T. OZAKI, *Assistant Examiner.*